United States Patent [19]

Harris et al.

[11] Patent Number: 5,707,121
[45] Date of Patent: Jan. 13, 1998

[54] ANTI-LOCK BRAKING SYSTEMS (ABS) FOR ROAD VEHICLES TO AVOID PREMATURE ENGAGEMENT OF THE ANTI-LOCK BRAKING SYSTEM

[75] Inventors: Alan Leslie Harris, Coventry; Mark Ian Phillips, Yardley, both of England

[73] Assignee: Lucas Industries PLC, Solihull West Midlands, England

[21] Appl. No.: 545,769

[22] PCT Filed: Jun. 10, 1994

[86] PCT No.: PCT/GB94/01258

§ 371 Date: Nov. 24, 1995

§ 102(e) Date: Nov. 24, 1995

[87] PCT Pub. No.: WO95/26286

PCT Pub. Date: Oct. 5, 1995

[51] Int. Cl.$^6$ ............................................. B60J 8/00
[52] U.S. Cl. .......................... 303/194; 303/154; 303/164
[58] Field of Search ................................ 303/176, 194, 303/195, 196, 175, 163, 177, 186, 137, 165

[56] References Cited

U.S. PATENT DOCUMENTS

| | | | |
|---|---|---|---|
| 4,921,312 | 5/1990 | Harris | 303/194 |
| 5,324,102 | 6/1994 | Roll et al. | 303/137 |
| 5,342,118 | 8/1994 | Kampfmann et al. | 303/194 |
| 5,386,366 | 1/1995 | Roll et al. | 303/137 |
| 5,425,574 | 6/1995 | Sano | 303/154 |
| 5,505,532 | 4/1996 | Tozu et al. | 303/165 |

FOREIGN PATENT DOCUMENTS 3918614  12/1989  Germany ............................. 303/176

Primary Examiner—Matthew C. Graham
Attorney, Agent, or Firm—Oblon, Spivak, McClelland, Maier & Neustadt, P.C.

[57] ABSTRACT

An anti-skid braking system for wheeled vehicles having fluid actuated brakes associated with the vehicle wheels. The anti-skid braking system includes speed sensors associated with the vehicle wheels, a scanning control device response to speed signals from the speed sensors to actuate a pressure dump device to periodically release the fluid pressure applied to the brake of any wheel which is determined, by detection of a predetermined level of relative slip between that wheel and the road surface to be about to lock. Later, the system, by detection, can re-apply the actuating pressure to that brake when the tendency of that wheel to lock has been reduced. Additionally, the system includes a control device adapted to adjust the magnitude of said predetermined level of relative slip to which said control device responds such as to reduce the slip sensitivity at the first sign of an impending skid condition, to maintain the slip sensitivity at this level for a period corresponding to the time needed by the axle to move rapidly through its available deflection, and to then restore the slip detection sensitivity to its normal level.

20 Claims, 7 Drawing Sheets ated with that wheel and to later re-apply the pressure when the tendency of that wheel to lock has reduced. A wheel-lock/skid condition is usually determined in such systems by detecting the occurrence of a predetermined drop ($\delta v$) in wheel speed (corresponding to a predetermined level of relative slip between the wheel and the road surface) following the achievement of a predetermined wheel deceleration (often identified as $-b$).

ANTI-LOCK BRAKING SYSTEMS (ABS) FOR ROAD VEHICLES TO AVOID PREMATURE ENGAGEMENT OF THE ANTI-LOCK BRAKING SYSTEM

BACKGROUND OF THE INVENTION

1. Field of the Invention

The present invention relates to ABS systems for road vehicles.

2. Description of the Related Art

Such systems operate by responding to an impending wheel-lock/skid condition at any particular wheel to reduce (dump) the actuating pressure applied to the brake associated with that wheel and to later re-apply the pressure when the tendency of that wheel to lock has reduced. A wheel-lock/skid condition is usually determined in such systems by detecting the occurrence of a predetermined drop ($\delta v$) in wheel speed (corresponding to a predetermined level of relative slip between the wheel and the road surface) following the achievement of a predetermined wheel deceleration (often identified as $-b$).

There is a trend for modern vehicle chassis to allow considerable rearward movement of the axles when bumps are encountered. This helps cushion the reaction felt at the passenger cabin, and thus contributes to improved comfort in the vehicle ride.

Unfortunately, any longitudinal compliance will also allow axle deflection when the tires are reacting to normal braking forces. If the deflection occurs in a short space of time, e.g. due to a sudden brake application, then it will be perceived by the ABS as a rapid fall in wheel speed. This is because rearward movement of the axle, taking place in a finite period of time, corresponds to a velocity in the opposite sense to that of vehicle motion.

Premature ABS activity may be triggered in prior art systems because these systems are unable to distinguish between normal adhesion-generated slip and transient axle deflection described above. This could only be avoided by setting the system's skid-detection thresholds at relatively insensitive levels. However, these may well be quite inappropriate to slower rates of pressure increase under which conditions the axle deflection takes place over a longer time period, such that the effect upon the perceived slip is insignificant.

Thus an awkward compromise must be achieved. Premature detection can delay the establishment of full deceleration levels and may also lead to driver complaints if the ABS intervenes under "normal" operating conditions. On the other hand, late detection (due to a lack of sensitivity) of an impending skid can also cause loss of performance due to excessive pressure overshoot, which precipitates high slip between the tire and road surface, needing considerable pressure reduction before the wheel will show signs of recovery. On a high-$\mu$ road surface, this recovery will be quite rapid, leading to a period of underbraking until the ABS can re-establish the correct pressure level. The resulting see-saw behaviour of the vehicle is also likely to draw driver criticism.

However, deflection-generated slip has a maximum value determined by the movement allowed and the maximum rate at which the braking force can be developed (determined by the characteristics of the brake actuating system). A typical maximum value for a passenger car is 6 km/h, although this will vary by a small amount (say ±1 km/h) according to the torsional stiffness of the tires.

SUMMARY OF THE INVENTION

In accordance with the present invention, the slip sensitivity of the system is arranged to be set to a relatively insensitive level at the first sign of an impending skid, is maintained at this level for a period corresponding to the time needed by the axle to move rapidly through its available deflection, and is arranged to be then restored in one or more stages to a normal level.

BRIEF DESCRIPTION OF THE DRAWINGS

The invention is described further hereinafter, by way of example only, with reference to the accompanying drawings, in which.

DETAILED DESCRIPTION OF THE PREFERRED EMBODIMENTS

As stated hereinbefore, in a system in accordance with the present invention, the slip sensitivity of the system is arranged to be set to a relatively insensitive level at the first sign of an impending skid, is maintained at this level for a period corresponding to the time needed by the axle to move rapidly through its available deflection, and is arranged to be then restored in one or more stages to a normal level.

Figure 1:
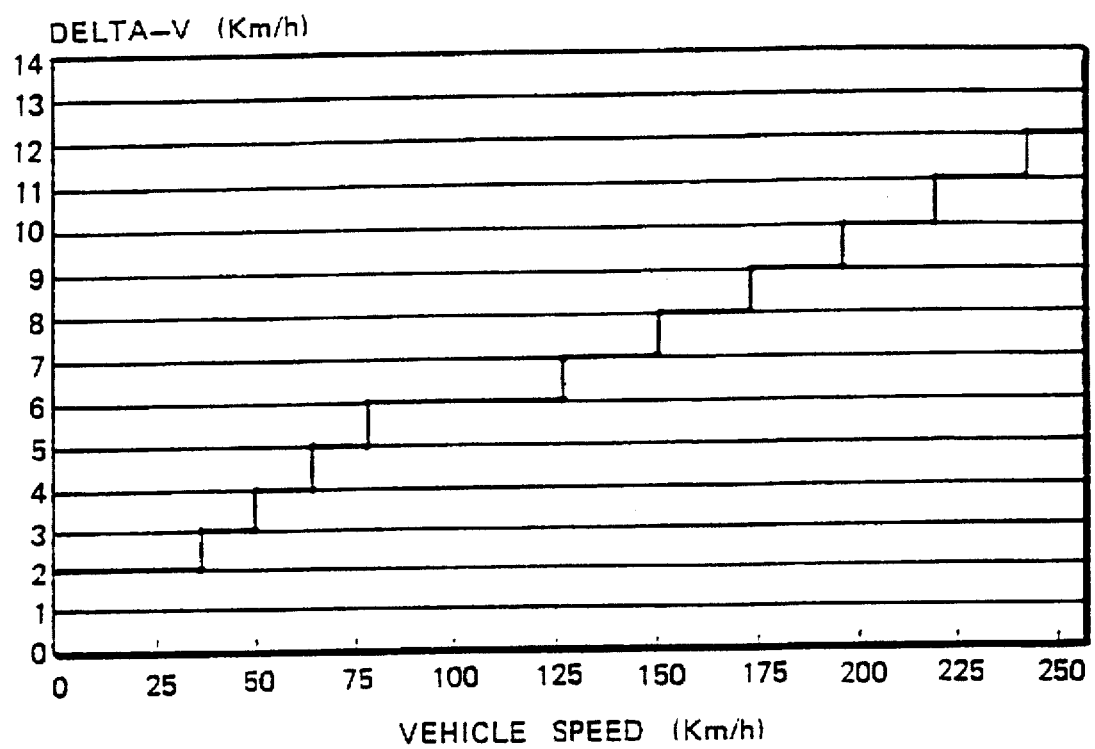
FIG. 1 shows an example of how the wheel speed drop thresholds (Delta-V) might vary with speed in the application of the present invention.

For example, in a system wherein a skid is detected by monitoring the drop in wheel-speed following the achievement of a pre-determined wheel deceleration (e.g. 1.5 g), the speed-drop threshold might vary with speed in the manner shown in FIG. 1. Thus, at low vehicle speeds, the threshold is less than that which could be achieved by axle deflection alone, presenting a risk of premature ABS activity.

Figure 2:
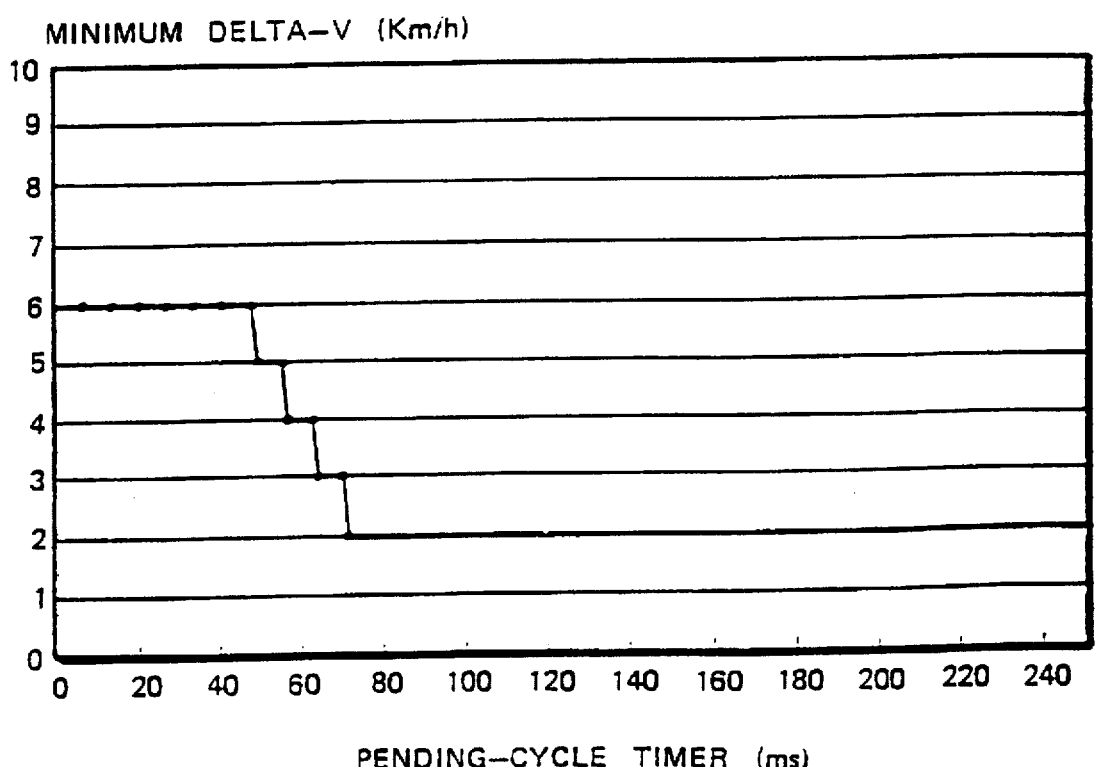
FIG. 2 shows an example of how the minimum speed drop thresholds (minimum Delta-V) might vary progressively with each successive scan-period.

In a preferred arrangement in accordance with the invention, a pending cycle timer is arranged to be initialised when the wheel deceleration threshold ($-b$) has been reached, and will run for a number (e.g. a total of 36) controller scan-periods (e.g. of 7 ms each) irrespective of whether the wheel maintains the pre-determined deceleration or not. This is because the wheel deceleration may change to acceleration as the wheel resumes its normal running speed once the deflection has been taken up. At the same time, the speed-drop threshold ($\delta v$) is arranged to have a predetermined minimum value judged sufficient (e.g. 6 km/h) to prevent premature ABS activity. Once the timer has counted down through a span corresponding with the fastest practicable axle-displacement time (e.g. 7 scan-periods), this minimum value is reduced progressively (FIG. 2) with each successive scan-period so that the normal speed dependent δv threshold is restored.

This deflection-insensitive logic is not allowed to re-trigger until the pending cycle timer has expired. Its duration is judged so as to ensure that, should the wheel behaviour develop into a skid, this will be detected using normal δv sensitivity levels. However, the −b signal may have resulted from irregularities in the road surface, in which case the period during which the deflection-insensitive logic is inhibited should be short, so as to ensure that a subsequent brake application is correctly handled. Thus, the duration of the pending-cycle timer is selected to provide the best compromise between these two requirements.

In an advantageous embodiment/the pending cycle timer may be arranged to freeze for as long as the wheel deceleration exceeds another predetermined level (e.g. 1.0 g). This could occur at any point but would sensibly be confined to the section following the establishment of normal δv levels. The simplest case is to freeze the counter at its penultimate scan-period so that the deflection-insensitive logic cannot re-trigger immediately before a skid which had been developing at a slower-than-usual rate.

As a further precaution against premature ABS activity, first-cycle solenoid firings may be inhibited whenever the wheel deceleration is reducing. This allows the use of smaller minimum-δv levels.

If a high vehicle deceleration has already been established before the −b signal occurs (e.g. due to check braking below the adhesion limit), then most of the axle deflection will have already been taken-up. Under these circumstances an increased δv may cause pressure overshoot, resulting in more harm than good. One option is therefore to inhibit the deflection-insensitive first cycle logic when the vehicle deceleration exceeds a predetermined limit. A typical limit might be 50% g, but it is likely that it will be chosen to suit the particular vehicle type so as to ensure that subsequent deflection-induced premature firing does not occur until the deceleration has risen to at least, say, 80% g.

Figure 3:
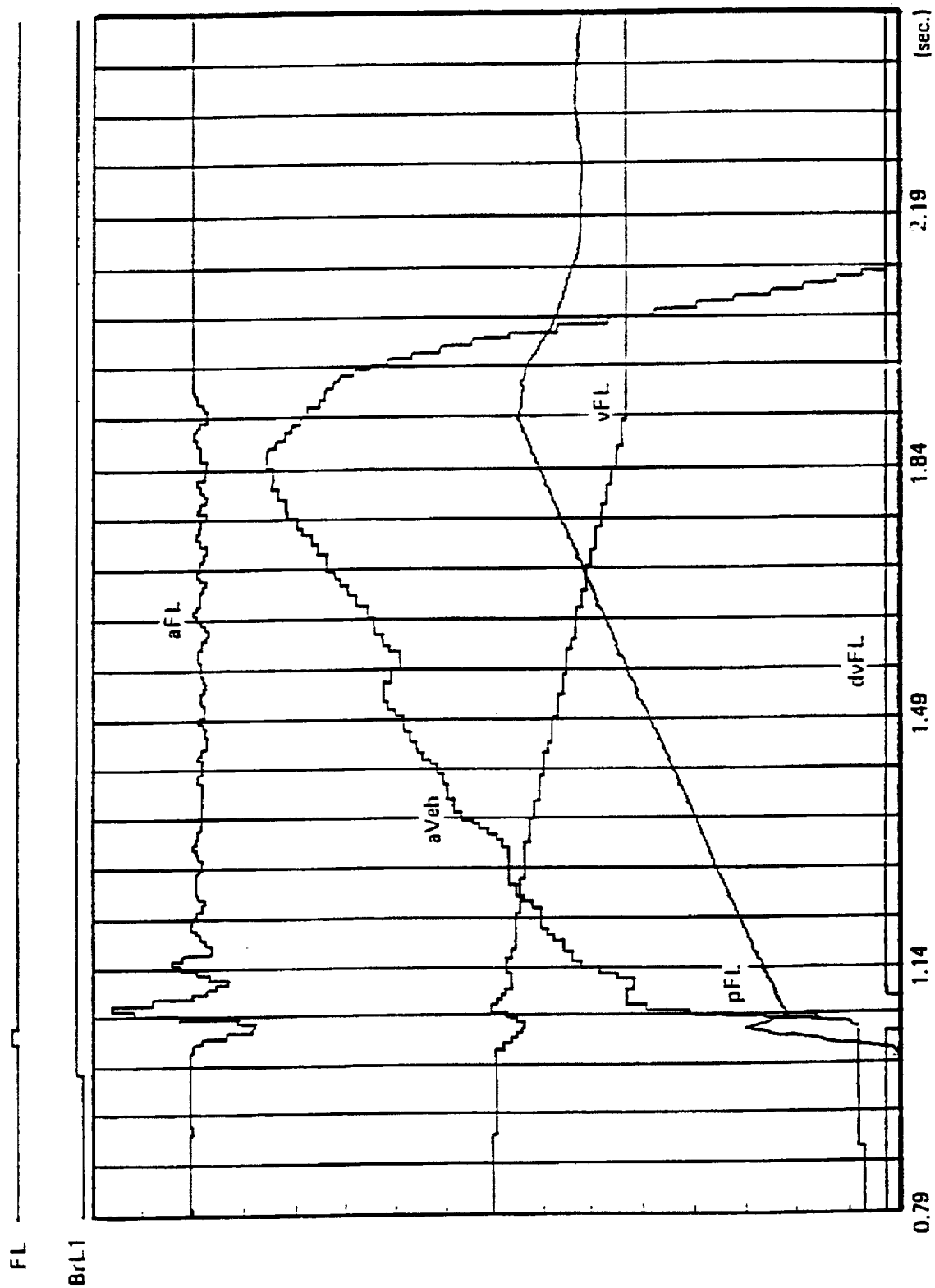
FIG. 3 illustrates, by way of a series of traces, the operational behaviour of a practical system constructed in accordance with the prior art.
Figure 4:
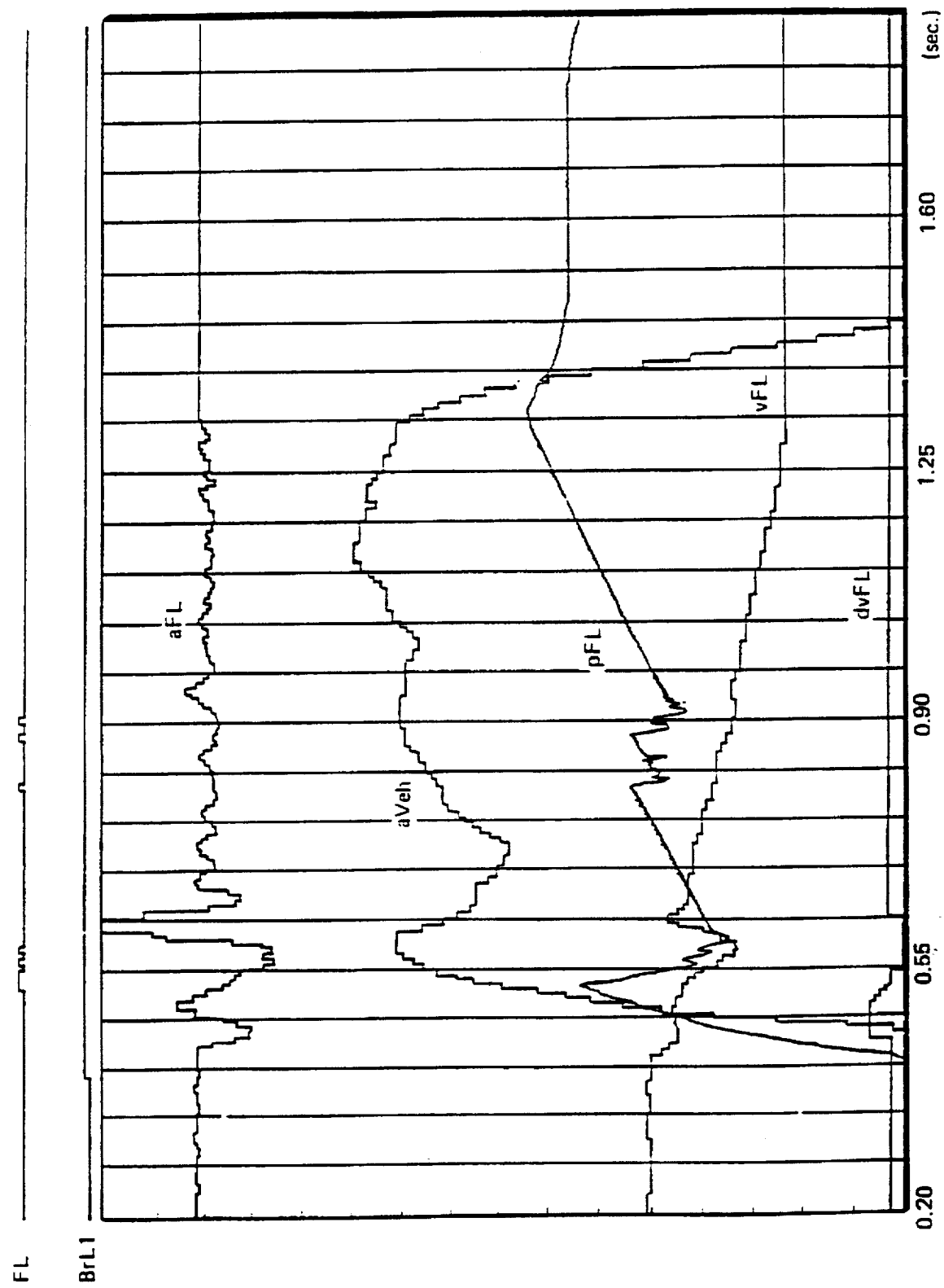
FIG. 4 illustrates, by way of a series of traces, the operational behaviour of a practical system constructed in accordance with the present invention.

FIGS. 3 and 4 show typical behaviour in a practical situation of a single front wheel on a vehicle to which an ABS system is fitted and which suffers from the type of suspension arrangement discussed hereinbefore. FIG. 3 illustrates the reaction of a prior art system and FIG. 4 that of a system embodying the present invention.

In each case, the traces are identified as follows:
FL: ABS induced pressure dump when this trace is high
BrLi: Vehicle brake lights on when this trace is high.
aFL: The acceleration of the single front wheel.
VFL: The rotational speed of the single front wheel.
pFL: The pressure in the brake caliper at the single front wheel.
dvFL: The change in speed required at the single front wheel following a predetermined wheel deceleration for an incipient skid condition to be recognised. This is referred to as the slip detection threshold (δV).

The effect of this threshold has been super-imposed on the wheel speed trace to clarify the requirement for skid detection, i.e. that the wheel speed must fall below a speed equal to the wheel speed present at the time the predetermined wheel deceleration threshold was exceeded MINUS the slip detection threshold.

aVeh: The longitudinal deceleration of the vehicle.

In general, an incipient skid condition is detected when a predetermined wheel deceleration has been exceeded followed by a predetermined change in wheel speed. The predetermined wheel deceleration threshold is called −B; the predetermined change in wheel speed is called δV.

In FIG. 3 (prior art), the calculated slip detection threshold is 2 kph. When the predetermined wheel deceleration threshold has been exceeded, the slip detection threshold is not increased. It can be seen that the skid detected based on this 2 kph threshold is too early. The wheel can sustain a braking pressure of over 100 bar, whereas the ABS-induced pressure dump has taken place when the pressure has reached only 60 bar. This results in a slow "attack" of the vehicle deceleration giving increased vehicle stopping distance.

In FIG. 4 (which represents an example of a system embodying the present invention), the calculated slip detection threshold is also 2 kph. However, when the predetermined wheel deceleration threshold has been exceeded, the slip detection threshold is increased following the rules described in the flowchart of FIG. 5, which prevents any skid detection taking place while the wheel's suspension movement is being absorbed. The magnitude, duration and decay rate of the increase in slip detection threshold are chosen dependent upon individual vehicle characteristics. The result of this action is that the first ABS-induced pressure dump is postponed until the pressure at the brake is of the order of 120 bar, resulting in a fast "attack" of the vehicle deceleration which reduces the vehicle stopping distance. (Because vehicle stopping distance is proportional to the square of the vehicle speed, a high deceleration while the vehicle speed is relatively high is more beneficial than a high deceleration when the vehicle speed is relatively low).

Figure 5:
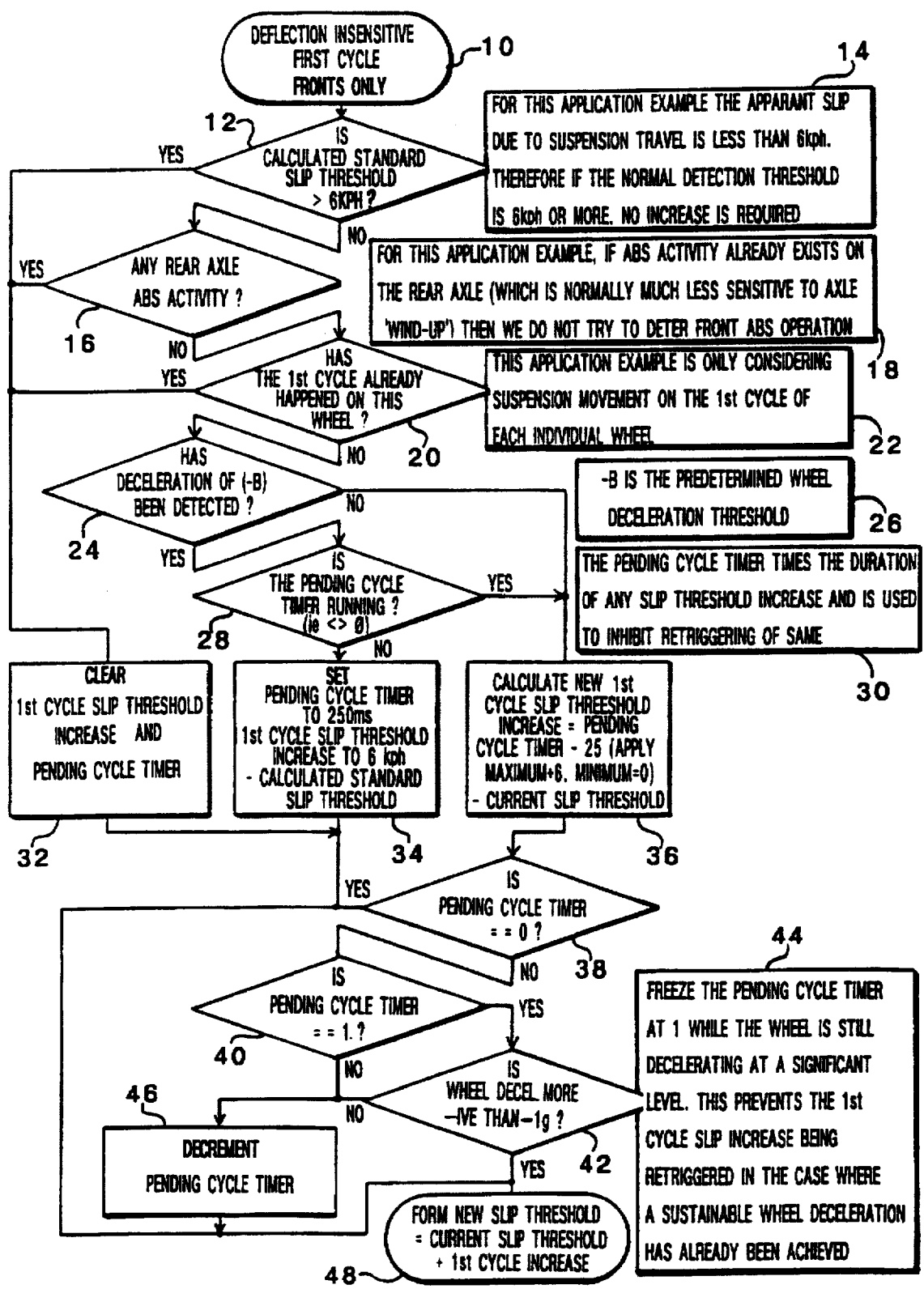
FIG. 5 is a flow chart illustrating the operation of one possible embodiment in accordance with the invention.

The various boxes identified in FIG. 5 are explained hereinafter as follows:

10—Deflection insensitive first cycle—FRONTS ONLY
12—Is calculated standard slip threshold>6 kph?
14—For this application example, the apparent slip developed due to suspension travel is less than 6 kph. Therefore if the normal slip detection threshold is 6 kph or more, no increase is required.
16—Any rear axle ABS activity?
18—For this application example, if ABS activity already exists on the rear axle (which is normally much less sensitive to suspension "wind up") then we do not try to defer front ABS operation.
20—Has the first cycle already happened on this wheel?
22—This application example is only considering suspension movement on the 1st cycle of each individual wheel.
24—Has deceleration of (−b) been detected?
26—(−b) is the predetermined wheel deceleration threshold.
28—Is the pending cycle timer running? ie. not equal to zero.
30—The pending cycle timer times the duration of any slip threshold increases and it used to inhibit retriggering of same.
32—CLEAR 1st cycle slip threshold increase and pending cycle timer
34—SET pending cycle timer to 250 ms 1st cycle slip threshold increase to 6 kph—calculated standard slip threshold.
36—Calculate new 1st cycle slip threshold increase= pending cycle timer—25 (apply maximum+6, minimum= 0)—current slip threshold.
38—Is pending cycle timer=0?
40—Is pending cycle timer=1?
42—Is wheel deceleration more negative than −1 g?
44—Freeze the pending cycle timer at 1 while the wheel is still decelerating at a significant level. This prevents the 1st cycle slip threshold increase being retriggered in the case where a sustainable wheel deceleration has already been achieved.

46—DECREMENT Pending cycle timer.

48—Form new slip threshold=current slip threshold +1st cycle increase.

Figure 6:
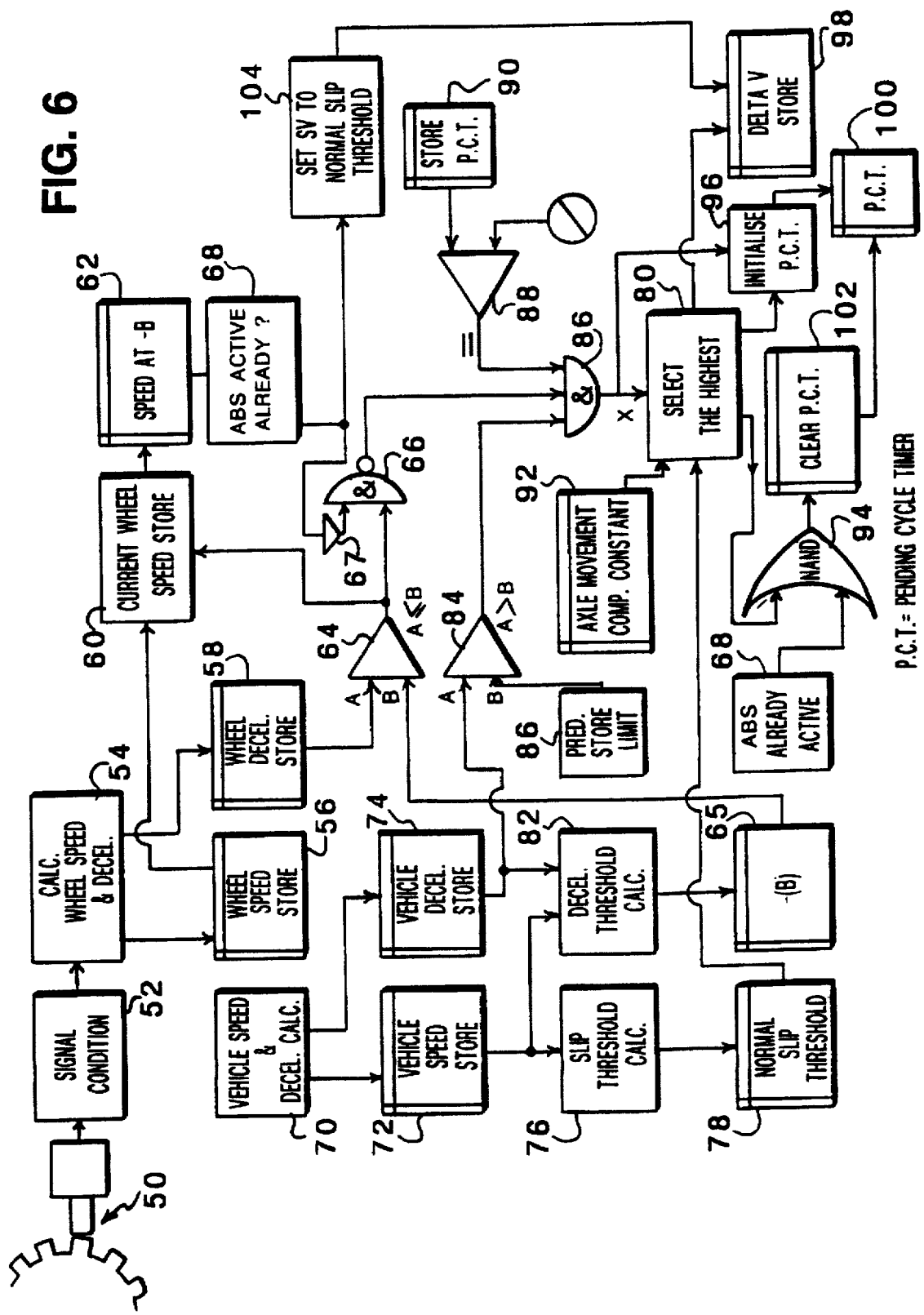
FIG. 6 is a block diagram of one embodiment of a first cycle threshold modified in accordance with the present invention.

Reference is now made to FIG. 6 of the accompanying drawings which shows one embodiment of an ABS system incorporating a first cycle threshold modifier in accordance with the present invention.

Reference numeral 50 identifies a conventional wheel speed sensor associated with one of the vehicle wheels (not shown). The output signal from the sensor 50 is conditioned at 52 and passed to a unit 54 which calculates the wheel speed and deceleration and passes these to a wheel speed store 56 and wheel deceleration store 58, respectively. The stored current wheel speed is also held in a unit 60 and the wheel speed at the −b detection point is held at 62. The deceleration signal from store 58 is passed to one input (A) of a comparator 64 whose other input (B) is connected to a store 65 holding the value of −b. When input A≦B the comparator 64 provides an output firstly to the "store current wheel speed" unit 60 and secondly to one input of a NOT AND gate 66. The other input of the gate 66 is connected via an inverter 67 to a unit 68 which supplies a signal only when the ABS system is already active.

Vehicle speed and deceleration are calculated in a calculation unit 70 and the resulting speed and deceleration figures are stored in vehicle speed and vehicle deceleration stores 72,74, respectively. The vehicle speed signal is passed to a unit 76 where the slip threshold (δv) is calculated. The normal slip threshold is stored in a store 78 and passed to one input of a "select the highest" unit 80. The vehicle speed and vehicle deceleration signals are also passed to a calculation unit 82 where the deceleration threshold is calculated and passed to the (−b) store 65. The vehicle deceleration signal is also passed to one input (A) of a comparator 84, whose other input (B) receives a predetermined limit value from a limit store 86. When input A of comparator 84>input B, this comparator provides a signal to one input of an AND gate 86. A second input to the AND gate 86 is taken from the output of the NOT AND gate 66. A third input to the AND gate 86 is taken from a comparator 88 which provides an output when the pending cycle timer output, held in a store 90, is equal to zero.

The "select the highest" unit 80 receives further inputs from an "axle movement compensation constant" store 92 and from the AND gate 86. The unit 80 provides outputs which are directed to one input of a NAND gate 94, an "initialise the pending cycle timer" element 96, and a delta V (δv) store 98. The output of the AND gate 86 is also passed to the "initialise p.c.t." unit 96, whose output is fed to a store 100 which holds the pending cycle timer value. The store 100 is also connected to a "clear pending cycle timer" element 102 coupled to the output of the NAND gate 94. The latter gate has a second input connected to the "ABS already active" signal obtained from unit 68. Finally, the delta V store 98 is also coupled to the "ABS active already" signal from unit 68 via a unit 104 which is adapted to set the delta V (δv) level to the "normal slip threshold".

A description of the operation of the aforegoing system will follow hereinafter.

Figure 7:
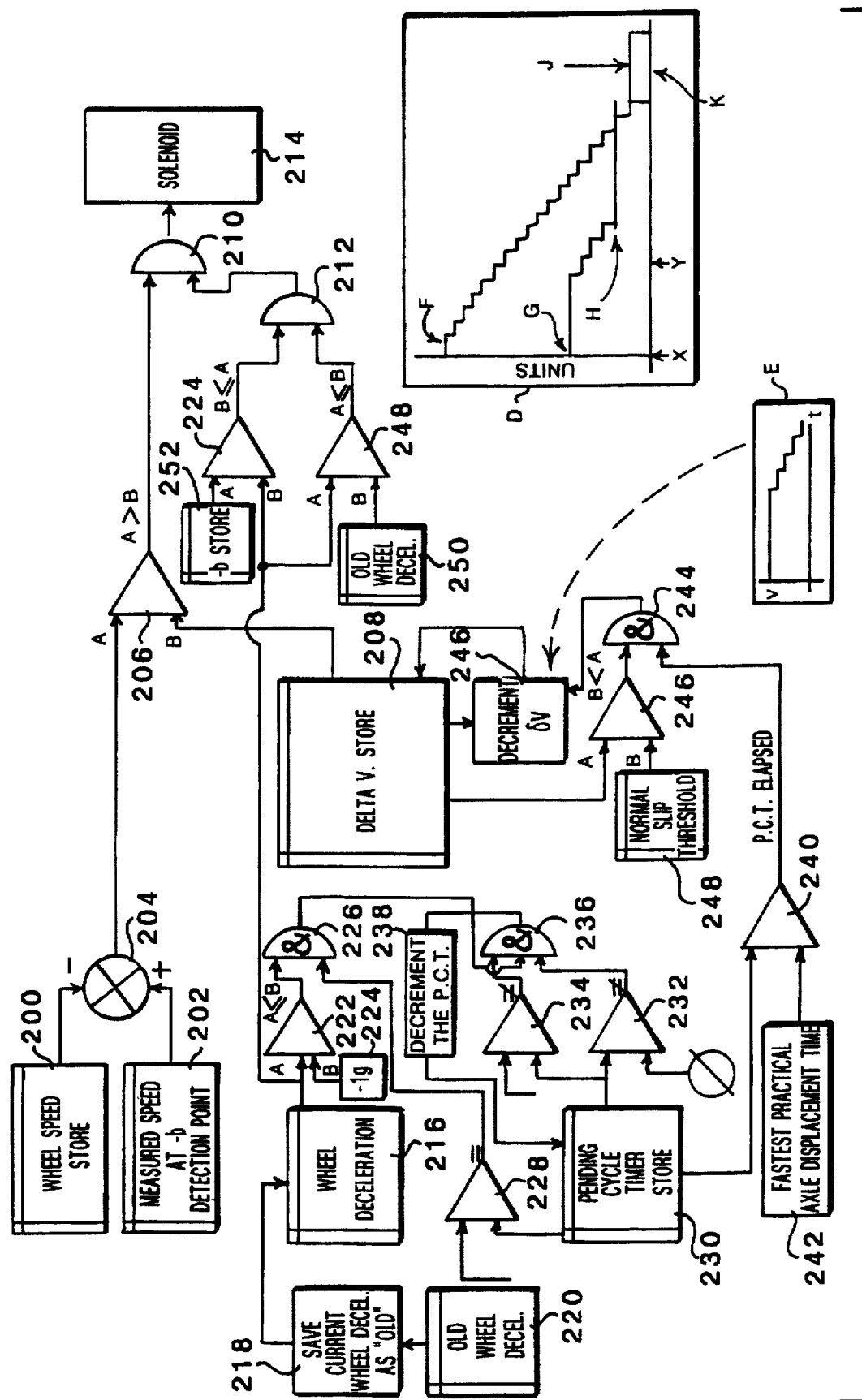
FIG. 7 is a block diagram illustrating post detection threshold modification in accordance with the invention.

Turning now to FIG. 7, there is illustrated an example of post detection threshold modification, which is executed once per period (Scan) of the main control device.

In FIG. 7, a wheel speed store is shown at 200. Reference numeral 202 identifies a store which holds the measured speed at the −b detection point. The wheel speed signal is subtracted from the signal in the store 202 at an arithmetic unit 204 and passed to one input (A) of a comparator 206. The other input (B) of the comparator 206 is connected to a store 208 holding the delta V (δv) value. If A>B at the comparator 206, this provides a signal to an AND gate 210. The other input of the AND gate 210 is taken from the output of a further AND gate 212. On receipt of signals from both the comparator 206 and the AND gate 212, the AND gate 210 provides an activating signal to a drive solenoid 214, for achieving dumping (releasing) of the actuating pressure to the relevant brake actuator.

Wheel deceleration is stored in a store 216 and passed via an element 218 which acts to "save current wheel deceleration as "old" deceleration at end of period". The "old" deceleration is held in a store 220. The stored wheel deceleration is also passed by the store 216 to one input (A) of a comparator 222 and also to one input (B) of a comparator 224. The other input (B) of the comparator 222 receives a reference value from a store 224 representative of a deceleration of, for example, −1 g. If the inputs (A) and (B) to comparator 222 satisfy the condition that A≦B then comparator 222 provides an output to a NOT AND gate 226. The gate 226 receives a second input from a comparator 228 when the latter comparator detects that the pending cycle timer value in a pending cycle timer store 230 is equal to "one".

Further comparators 232 and 234 provide signals to an AND gate 236 when the value in the pending cycle timer store 230 is "not zero" and "not one", respectively. The AND gate 236 receives a further input from the NOT AND gate 226 and provides an output to a "decrement the pending cycle timer" unit 238 coupled back to the pending cycle timer store 230.

A further comparator 240 provides a signal indicative of the p.c.t. having "elapsed" by comparison of the value held in the p.c.t. store 230 with an element 242 which holds a preset value representative of the fastest practicable axle displacement time. The "elapsed" signal is provided to one input of an AND gate 244, whose other input is connected to the output of a comparator 246. The one (B) input of the comparator 246 receives a signal from a store 248 containing the "normal slip threshold" while its other (A) input is connected to the delta V store 208. If the inputs A and B of the comparator 246 satisfy the condition that B<A then a signal is passed to the AND gate 244. The output of the AND gate 244 is fed to a unit 246 which acts to decrement the delta V (δv) level, as illustrated diagrammatically in the sub-section of FIG. 7 marked E.

A still further comparator 248 has its one (B) input connected to a store 250 containing the "old wheel deceleration" and its other (A) input connected to the wheel deceleration store 216. This comparator 248 provides an output if its inputs A and B satisfy the condition that A≦B. The latter output is passed to the AND gate 212.

The second (A) input of the comparator 224 receives the −b level from a store 252. If the A and B inputs of the comparator 224 satisfy the condition that B≦A, then the comparator provides an input to the AND gate 212.

The second sub-section of FIG. 7, marked D, shows an example of the relationship between δv and the pending cycle timer value. Arrow F in this subdiagram indicates the initial value of the pending cycle timer. Arrow G indicates the "axle movement compensation constant". Arrow H indicates the level of the "normal slip threshold". Arrow J indicates how it is arranged for the system to freeze at 1 if wheel deceleration is <1 g. Arrow K indicates that otherwise the p.c.t. value is allowed to decay to zero.

The apparatus of FIGS. 6 and 7 operates as follows.

Wheel speed and deceleration values are calculated and held in stores 56,58 in a known manner by means of the elements 52 and 54. Similarly, vehicle speed and deceleration are calculated by element 70 and held in stores 72 and 74. The normal slip detection threshold 78 is calculated by element 76 as, for example, a function of the vehicle speed. The deceleration detection threshold in store 65 (−b) is calculated by element 82 as (for example) a function of the vehicle speed and the vehicle deceleration. If ABS is already signalled to be active on the vehicle by means of element 68, then the δv value in store 98 is set by the element 104 and the pending cycle timer is cleared to zero via the elements 68,94 and 102.—this latter operation marking that the deflection insensitive first cycle is not active.

Figure 8:
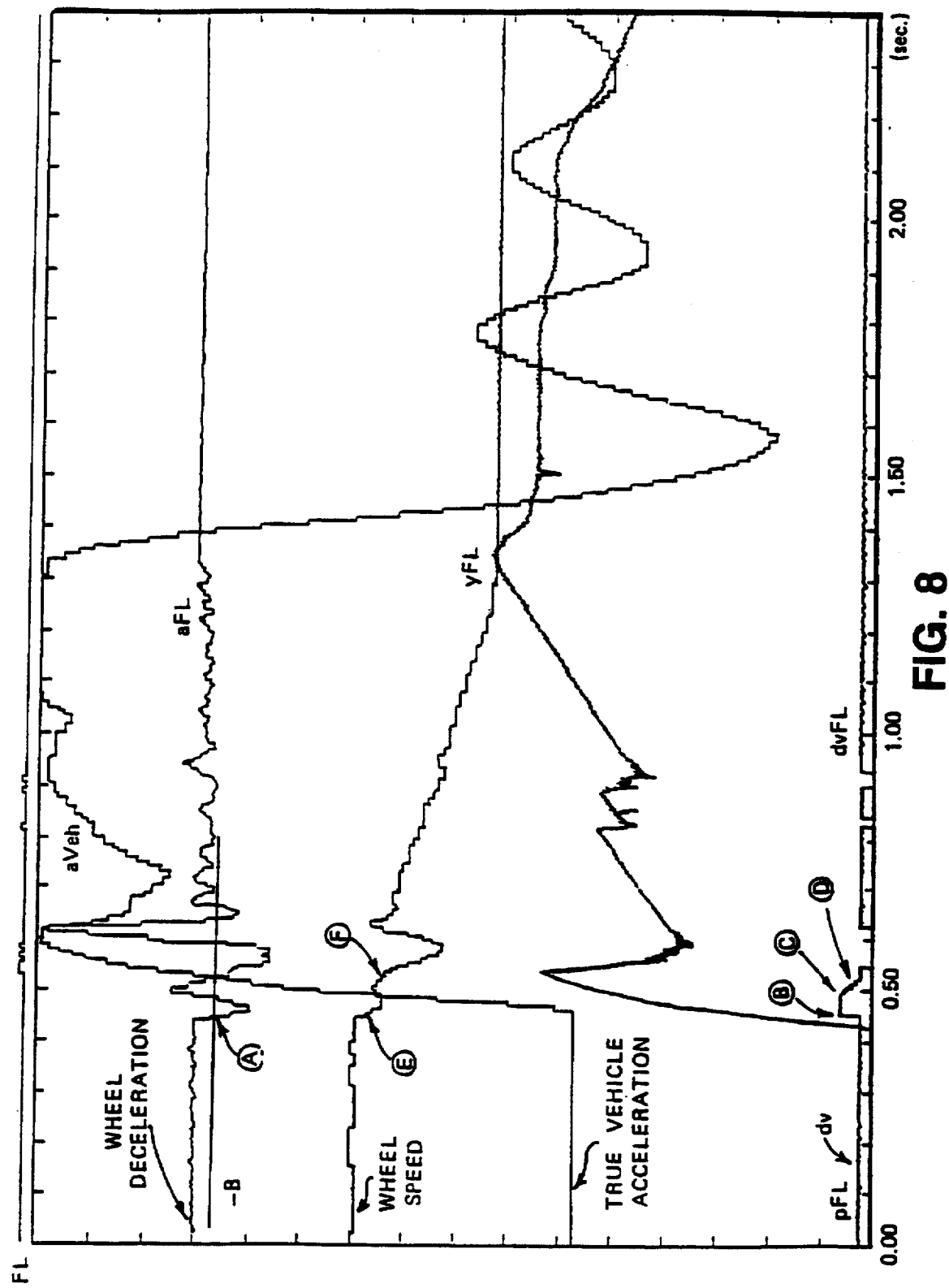
FIG. 8 is a series of traces used to explain the operation of the apparatus of FIGS. 6 and 7.

In order for the deflection insensitive first cycle mechanism to become active, several conditions must be satisfied simultaneously. The current wheel deceleration at element 58 must become more negative than or equal to the stored −b threshold at store 65, see point A in FIG. 8. This test is performed at comparator 64. When the output of comparator 64 is true, the current wheel speed value at 56 is stored at 62 as "speed at −b detection" by operation of element 60. If, when the output of comparator 64 is true, ABS is not currently active on the vehicle a signal 68 and from element inverter 67 then provides a "first detection" on the output of AND gate 66. If the AND gate 86 receives at the same time a signal from comparator 84 indicating that the vehicle deceleration is less negative than the predetermined limit held in 86, the signal from the AND gate 66, and a signal from the comparator 88 indicating that the pending cycle timer 90 is equal to zero, then a new value for δv is stored at store 98 (FIG. 8, point B) which is selected by element 80 to be the higher of either the normal slip detection threshold at 78 or an Axle Movement Compensation constant (AMCC) held in store 92. If at the element 80 it is found that the AMCC is the higher value, the pending cycle timer is initialised to a predetermined value at 96. If the normal slip threshold is the higher, then the pending cycle timer 100 is cleared to zero at 102. Whenever the pending cycle timer is nonzero, the deflection insensitive first cycle detection is active.

Referring now to FIG. 7, when the deflection insensitive first cycle detection mechanism is enabled (pending cycle timer 100 not equal to zero), the pending cycle timer 100 is decremented by element 238 once per measurement period, provided that its current value is not equal to (for example) one, as determined by elements 234, 228 and 226. When the pending cycle timer 100 has been decremented at element 240 by a value corresponding to the time interval "Fastest Practicable Axle Displacement Time" held in store 242, (point C in FIG. 8), the stored value δv in element 98 is decremented at 246 provided it is determined by elements 246 and 244 to be still greater than the normal slip threshold in store 78 (see point D in FIG. 8). While these processes are executing, the current value of wheel slip is being calculated at 204 with respect to the wheel speed which existed when −b was first detected. If this is greater than the current value of δv held in store 208 and if the current value of wheel deceleration held in store 216 is more negative than or equal to −b and if it is determined at gate 212 that the current value of wheel deceleration at 216 is more negative than or equal to the old value of the wheel deceleration calculated in the previous controller measurement period and held in store 250 then the ABS solenoid 214 will be fired (point F in FIG. 8).

We claim:

1. An anti-skid braking system for multi-axled wheeled vehicles having fluid actuated brakes associated with the vehicle wheels, comprising speed sensors associated with the vehicle wheels a scanning control device responsive to speed signals from the speed sensors to actuate a pressure dump device to periodically release the fluid pressure applied to the brake of any wheel which is determined, by detection of a predetermined normal level of relative slip between that wheel and the road surface, to be about to lock, and to later re-apply the actuating pressure to that brake when the tendency of that wheel to lock has reduced, and control means which includes:

(a) means for detecting when an anti-skid operation is in progress and for providing an inhibiting signal when an anti-skid operation is in progress;

(b) means which, in the absence of said inhibiting signal, adjusts the magnitude of said predetermined level of relative slip to which said control device responds such as to reduce a slip detection sensitivity to a low level below said normal level of relative slip, at the first detection of an impending skid condition;

(c) storage means for storing a signal representative of a predetermined time needed by an axle of the vehicle to move rapidly through its available deflection;

(d) means which maintain the slip detection sensitivity at the low level for a period corresponding to said predetermined time needed by the axle to move rapidly through its available deflection; and (e) means to then restore the slip detection sensitivity to the level corresponding to said normal level of relative slip.

2. An anti-skid braking system as claimed in claim 1, wherein said control means includes means to restore said slip detection sensitivity to the level corresponding to said normal level of relative slip in a plurality of stages.

3. An anti-skid braking system as claimed in claim 2, wherein said predetermined normal level of relative slip is determined by a wheel speed drop threshold (δv) measured after the detection of said predetermined wheel deceleration level (−b), the reduction being made to a predetermined minimum level judged sufficient to prevent premature ABS activity.

4. An anti-skid braking system as claimed in claim 2, wherein when a predetermined level (−b) of wheel deceleration has been reached, said reduction of the slip detection sensitivity is effected and a pending cycle timer is arranged to be initialized and allowed to run for a predetermined number of scan periods of said control device, irrespective of whether the wheel maintains said predetermined level of deceleration (−b), after which the slip detection sensitivity is progressively returned to the level corresponding to said normal level of relative slip over a number of further scan periods.

5. An anti-skid braking system as claimed in claim 2, wherein first-cycle pressure release operations are inhibited whenever the wheel deceleration is determined to be reducing.

6. An anti-skid braking system as claimed in claim 2, wherein the action of said control means to reduce the slip detection sensitivity is arranged to be inhibited when the vehicle deceleration exceeds a predetermined limit.

7. An anti-skid braking system as claimed in claim 1, wherein said predetermined normal level of relative slip is determined by a wheel speed drop threshold (δv), measured after the detection of said predetermined wheel deceleration level (−b), the reduction in slip detection sensitivity being made to a predetermined minimum level judged sufficient to prevent premature ABS activity.

8. An anti-skid braking system as claimed in claim 7, wherein first-cycle pressure release operations are inhibited whenever the wheel deceleration is determined to be reducing.

9. An anti-skid braking system as claimed in claim 7, wherein the action of said control means to reduce the slip detection sensitivity is arrange to be inhibited when the vehicle deceleration exceeds a predetermined limit.

10. An anti-skid braking system as claimed in claim 1, wherein, when a predetermined level (−b) of wheel deceleration has been reached, said reduction of the slip detection sensitivity is effected and a pending cycle timer is arranged to be initialised and allowed to run for a predetermined number of scan periods of said control device, irrespective of whether the wheel maintains said predetermined level of deceleration (−b), after which the slip detection sensitivity is progressively returned to the level corresponding to said normal level of relative slip over a number of further scan periods.

11. An anti-skid braking system as claimed in claim 10 including means preventing re-triggering of said control means until said pending cycle timer has run for said predetermined number of scan periods.

12. An anti-skid braking system as claimed in claim 11, wherein first-cycle pressure release operations are inhibited whenever the wheel deceleration is determined to be reducing.

13. An anti-skid braking system as claimed in claim 11, wherein the action of said control means to reduce the slip detection sensitivity is arranged to be inhibited when the vehicle deceleration exceeds a predetermined limit.

14. An anti-skid braking system as claimed in claim 10 including means to freeze said pending cycle timer for as long as the wheel deceleration exceeds a further predetermined level.

15. An anti-skid braking system as claimed in 14, wherein first-cycle pressure release operations are inhibited whenever the wheel deceleration is determined to be reducing.

16. An anti-skid braking system as claimed in claim 14, wherein the action of said control means to reduce the slip detection sensitivity is arranged to be inhibited when the vehicle deceleration exceeds a predetermined limit.

17. An anti-skid braking system as claimed in 10, wherein first-cycle pressure release operations are inhibited whenever the wheel deceleration is determined to be reducing.

18. An anti-skid braking system as claimed in claim 10, wherein the action of said control means to reduce the slip detection sensitivity is arranged to be inhibited when the vehicle deceleration exceeds a predetermined limit.

19. An anti-skid braking system as claimed in claim 1, wherein first-cycle pressure release operations are inhibited whenever the wheel deceleration is determined to be reducing.

20. An anti-skid braking system as claimed in claim 1, wherein the action of said control means to reduce the slip detector sensitivity is arranged to be inhibited when the vehicle deceleration exceeds a predetermined limit.

* * * * *

UNITED STATES PATENT AND TRADEMARK OFFICE
CERTIFICATE OF CORRECTION

PATENT NO. : 5,707,121
DATED : January 13, 1998
INVENTOR(S) : Alan Leslie HARRIS, et al.

It is certified that error appears in the above-indentified patent and that said Letters Patent is hereby corrected as shown below:

On the title page, item [30] is missing. It should be:

--[30]    Foreign Application Priority Data
   Mar. 25, 1994   [WIPO]   ..............   PCT/GB94/00624
   Mar. 25, 1994   [WIPO]   ..............   PCT/GB94/00623--

Signed and Sealed this

Twenty-fourth Day of March, 1998

Attest:

BRUCE LEHMAN

*Attesting Officer*        *Commissioner of Patents and Trademarks*